(12) United States Patent
Penczak

(10) Patent No.: US 8,153,910 B1
(45) Date of Patent: Apr. 10, 2012

(54) JUNCTION AND OUTLET BOXES FOR IN FLOOR WIRING SYSTEMS

(76) Inventor: John P. Penczak, Washington, WV (US)

( * ) Notice: Subject to any disclaimer, the term of this patent is extended or adjusted under 35 U.S.C. 154(b) by 386 days.

(21) Appl. No.: 12/492,290

(22) Filed: Jun. 26, 2009

Related U.S. Application Data

(60) Provisional application No. 61/076,286, filed on Jun. 27, 2008.

(51) Int. Cl.
*H02G 3/08* (2006.01)
*B23P 17/00* (2006.01)

(52) U.S. Cl. .......................... 174/486; 220/3.3; 29/897.3

(58) Field of Classification Search ................... 174/486
See application file for complete search history.

(56) References Cited

U.S. PATENT DOCUMENTS

| | | | |
|---|---|---|---|
| 1,925,849 A | 9/1933 | Sharp | |
| 2,063,569 A | 12/1936 | Walker | |
| 2,919,827 A | 1/1960 | Cubberley | |
| 3,013,690 A | 12/1961 | Johnson et al. | |
| 3,061,663 A | 10/1962 | Reiland | |
| 3,264,791 A | 8/1966 | Hudson | |
| 3,428,203 A | 2/1969 | King et al. | |
| 3,453,791 A | 7/1969 | Fork | |
| 3,721,051 A | 3/1973 | Fork | |
| 3,784,042 A | 1/1974 | Hadfield et al. | |
| 3,908,074 A * | 9/1975 | Berg ............................... | 174/58 |
| 4,931,597 A | 6/1990 | Kimbrough et al. | |
| 6,072,121 A | 6/2000 | Penczak et al. | |

OTHER PUBLICATIONS

"Wiremold/Legrand—Infloor Distribution Systems Design Guide"; 2005; product brochure—ED1286R1 505; pp. 1-18.
Wiremold/Legrand; Walkderduct Pro Series & Round Insert Ducts; Jun. 2006; product brochure ED830R9- pp. 1-12.
Dennis Filges Company Inc.; Raceway Solutions; In-Floor Wire Management Systems;Conventional Underfloor Duct dated 2005; product brochure; 3 pages.
CRFP Conduflor (TM) Underfloor Raceway Products' Conduflor (TM) Underfloor Duct Systems; printout from website http://www.commercialroll.com/conduflor/conduflor.htm; Sep. 20, 2002, 3 pages.
Hubbell Wiring Device-Kellems; Wall and Floor Boxes; printout from website http://www.hubbell-wiring.com/FloorandWall.asp; at least as early as Sep. 13, 2007; 2 pages.
Steel City Floor Boxes-Overview; 2003 Thomas & Betts Corporation; pp. D2 and D3.

(Continued)

*Primary Examiner* — Timothy Thompson
*Assistant Examiner* — Hiram E Gonzalez
(74) *Attorney, Agent, or Firm* — Calfee, Halter & Griswold LLP

(57) ABSTRACT

A utility floor box includes a body having a horizontal base, first and second longitudinally extending side walls extending from first and second opposed edges of the horizontal base, and first and second laterally extending end walls extending from third and fourth opposed edges of the horizontal base. At least one of the first and second side walls defines a branch opening, and at least one of the first and second end walls defines a duct opening. First and second horizontal support bars extend through aligned first and second support openings in the first and second side walls. First and second vertical support legs are secured to the first support bar, and third and fourth vertical support legs secured to the second support bar. The first, second, third and fourth support legs are vertically adjustable with respect to the corresponding first and second support bars.

16 Claims, 8 Drawing Sheets

OTHER PUBLICATIONS

Typical Walkerduct Installations, Walkerduct Underfloor Duct; product brochure; at least as early as Jun. 27, 2008, 9 pages.

Wiremold/Legrand; Walkerduct® Underfloor Duct® Walkderduct Pro Series Systems; Installation Instruction No. 1B0161-R2—updated Jun. 2006; 12 pages.

Walker®; Flushduct® Duct and Junction Boxes; Installation Instruction No. 1B0169 498, 1998; 6 pages.

Wiremold®; Walker® Infloor Systems; Walkercell® Systems; Installation Instruction No. PDD-880 0901; 2001; 8 pages.

Wiremold®; Walker® Infloor Systems; Walkerduct® Junction Box; Side Rail Extension; Installation Instruction No. IB0174 0800; 2000.

H.H. Robertson Floor Systems, The Q-Floor/Taproute® System; The ultimate cable management system; printout from website; http://www.hhrobertson.com; at least as early as Feb. 6, 2008; 1 page.

H.H. Robertson Floor Systems, Q-Floor/Taproute® System; Cellular floor for steel frame construction; printout from website; http://www.hhrobertson.com/prodstuff/prod-1.cfm; at least as early as Feb. 6, 2008; 2 pages.

H.H. Robertson Floor Systems, Cellcast Floor System for Concrete Frame Construction; printout from website; http://www.hhrobertson.com/prodstuff/prod-2.cfm; at least as early as Feb. 6, 2008; 1 page.

H.H. Robertson Floor Systems, 3+1 System for Slab-On-Grade and Retrofit; printout from website; http://www.hhrobertson.com/prodstuff/prod-3.cfm; at least as early as Feb. 6, 2008; 2 pages.

United Steel Deck, Inc.; Activ-Dek Electrified Floor Distribution System; 1982; Catalog No. 404; 1982; 8 pages.

Wiremold/Legrand; FloorSource™ Raised Floor Boxes; A Raised Floor Box for Every Application; Catalog No. ED670R12; Feb. 2007; 8 pages.

Wiremold/Legrand; RFB11 &RFB9 Recessed Floor Box Series; Large Capacity Floor Boxes for Power, Communication, Audio, and Video Applications; Catalog No. ED1242R2; Mar. 2007; 8 pages.

Wiremold® Walker® Infloor Systems; RFB Recessed Floor Box; Installation Instruction No. 1 002 639 R2; Dec. 2008; 6 pages.

Square D; The Subway® Infloor Duct System; Distribution Product Catalog; Mar. 1995; 8 pages.

Square D; The Subway® Underfloor Raceway System Installation; Bulletin No. 45211-016-01*D; Sep. 2000; 4 pages.

Wiremold® Walker Infloor Systems; Standard AC8850 Raised Floor Box Bill of Material; Drawing No. 85436X2; Jun. 17, 2007; 1 page.

* cited by examiner

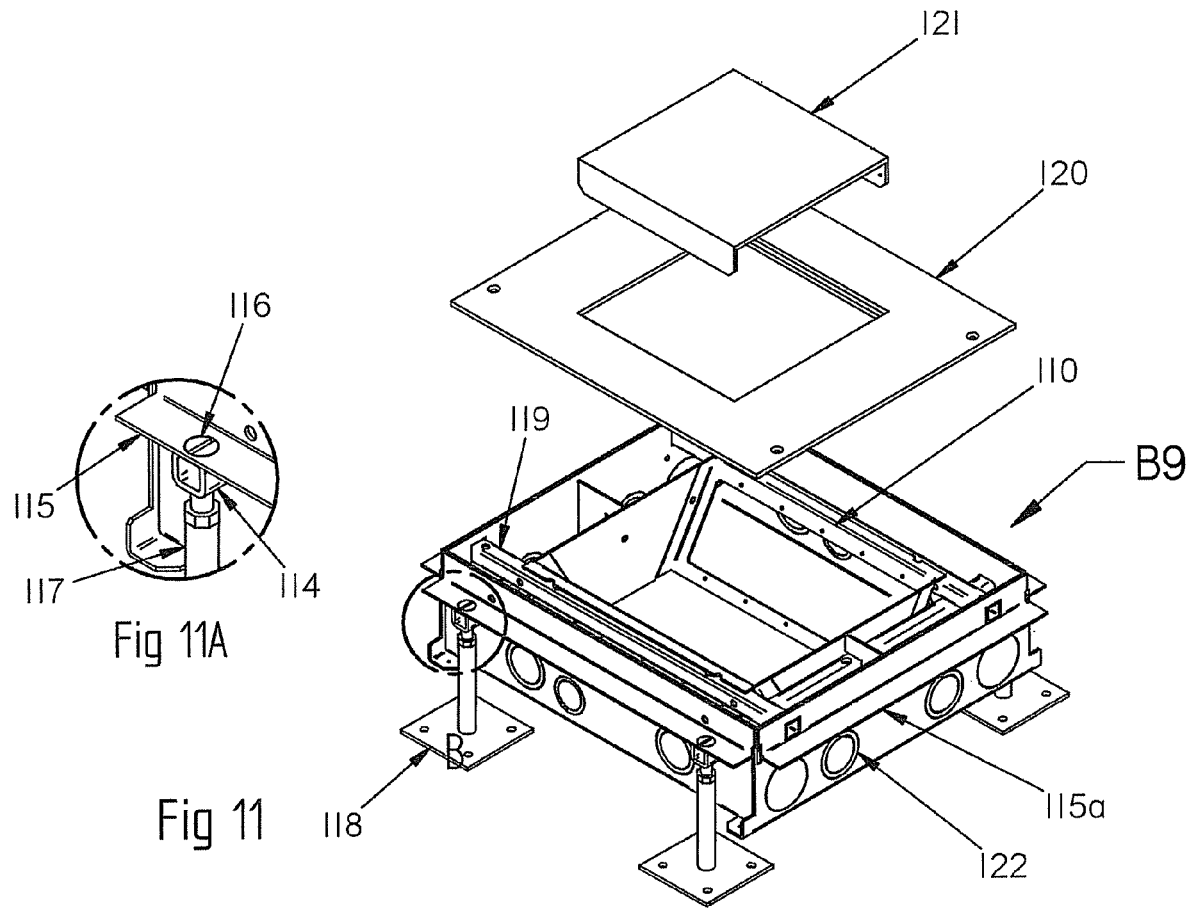
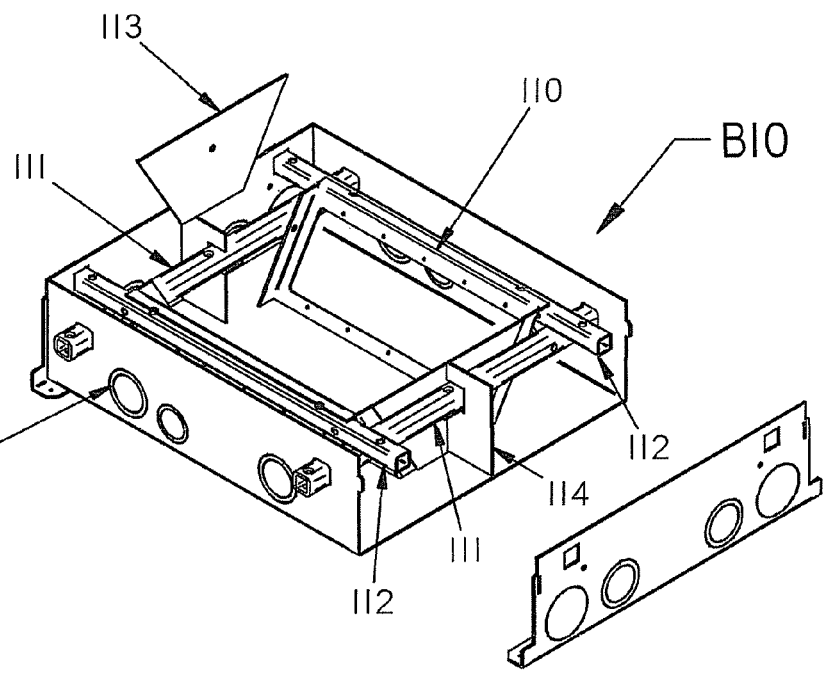

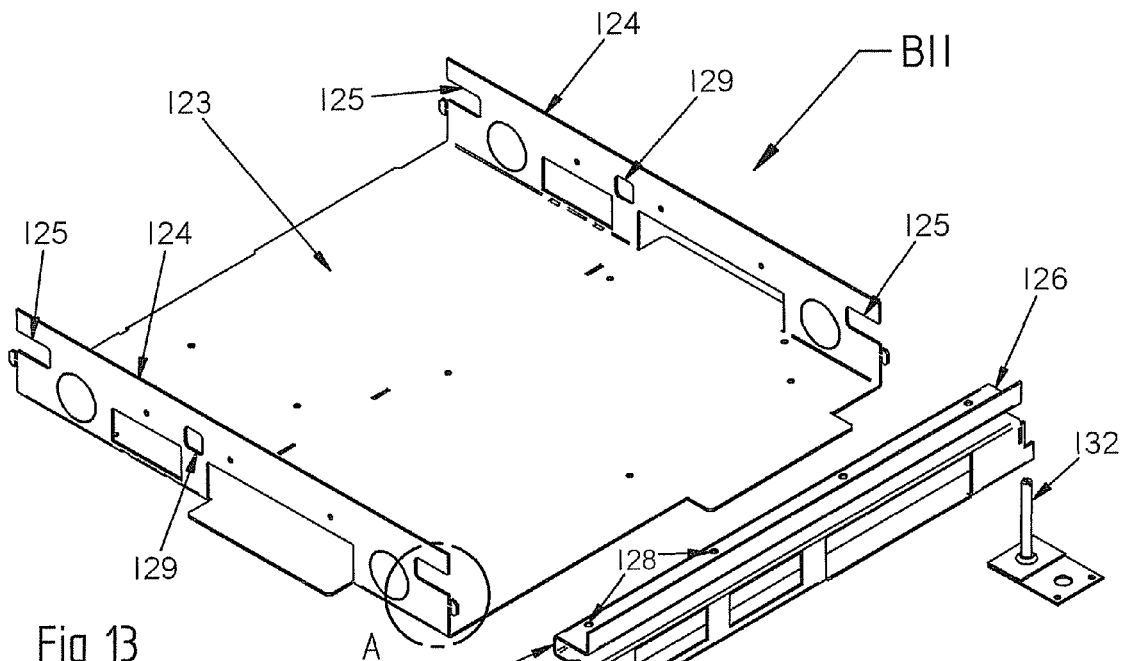
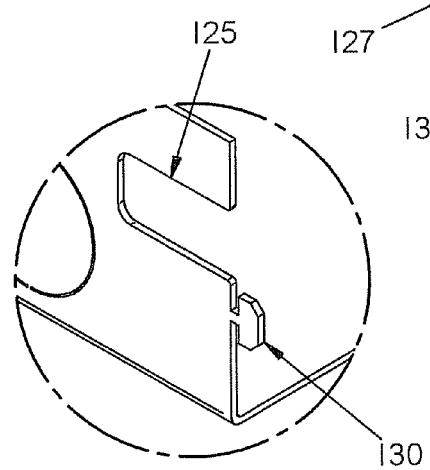
Fig 13
Fig 13A
Fig 13B

JUNCTION AND OUTLET BOXES FOR IN FLOOR WIRING SYSTEMS

CROSS-REFERENCE TO RELATED APPLICATION

This application claims the benefit of U.S. Provisional Patent Application Ser. No. 61/076,286, entitled "JUNCTION AND OUTLET BOXES FOR IN FLOOR WIRING SYSTEMS" and filed Jun. 27, 2008, the entire contents of which are incorporated herein by reference, to the extent that they are not conflicting with the present application.

BACKGROUND

Around the early 1900's a new, growing use of electrical and communication wiring was seen throughout the nation. Open office spaces with many workers lead to the development of a system of ducts or raceways embedded in the floor structure to distribute the wiring. These systems were called underfloor raceway systems, or underfloor ducts.

In 1912, H. S. Walker and H. N Walker opened Walker Brothers Co. in Philadelphia, Pa. By the early 1920's Walker Brothers introduced the first all steel underfloor raceway made from a rectangular metal tube about 1 inch high and 2 inch wide, called Walker #1 duct.

Along the length and at the top of each raceway round hollow hubs about ¾" diameter could be installed, usually 24" on center. The height of the hubs was about ⅛" less than the concrete toping over the duct. The hub was fitted with a recessed cap to prevent entrance of concrete. When access to the raceway was desired, concrete was chipped out and the cap was removed.

Wires were then pulled through the raceway, up through the hub and into an outlet box or floor fitting, sometimes called a pedestal or doghouse.

In addition to Walker #1 duct, Walker introduced a larger duct, 1¼" high and 3⅛" wide, commonly known as Walker #2 duct. A combination of #1 and #2 ducts is shown in U.S. Pat. No. 2,063,569. Outlet hubs more commonly called "preset inserts" with a 2" internal diameter conduit thread could now be installed on Walker #2 duct. As larger communication cabling became popular, #4 duct 1½" high by 6½" wide, was introduced in the 1950's. U.S. Pat. No. 3,061,663 shows the versatility of a duct system using larger sizes of duct. Walker #1 duct was discontinued in the 1950's, but Walker #2 and #4 duct in ten-foot lengths with or without factory installed 2" round preset inserts continues to be sold today.

Another old underfloor duct system specifically made for renovation projects is called a "flushduct" system. The system includes one, two, or three #2 ducts welded together and installed flush with the top surface of the concrete floor. An existing floor is cut to create a channel for this system. The Walker junction boxes for this system are still made from cast iron and only pedestal type outlets can be installed on flush duct. Cutting the floor of an older building is easier because of thick floors. Cutting the floor of newer buildings may weaken the floor slab so this system has limited usage.

Typical in-floor systems include parallel and perpendicular runs of duct connected at their intersections by junction boxes. Until the 1950's most junction boxes were made of cast iron. U.S. Pat. No. 2,919,827 describes a Walker junction box with a sheet metal top and a cast iron base.

The installation of a typical system begins with locating junction boxes in a row, usually 4 to 6 foot on center and installing duct between these boxes. These rows of duct and boxes are commonly called "feeder ducts" and usually begin at the electrical or communication rooms. Junction boxes are marked with arrows to indicate the feeder duct direction. Perpendicular to these rows, "distribution ducts" are installed into the junction boxes and provide a cable pathway to the workstations via the outlet hub and floor fitting. One way to visualize an underfloor layout is to think of the feeder duct runs as "highways" and the distribution runs as "side streets."

Conventional "single level" junction boxes are square and have equally sized duct openings at all four sides. U.S. Pat. No. 1,925,849 provided greater wiring capacity in the junction box and made a distinction between feeder and distribution (branch circuits) wiring. However, this all-cast iron box was expensive to produce and required a floor slab thickness about twice as thick as most single level boxes.

The need for more feeder duct runs than distribution runs in a single level junction box can be seen in the following example.

Assume a distribution duct run of No. 2 Walker duct is sixty foot long. If workstations are installed six feet on center and each of the 10 workstations require two duplexes each, 20 duplex receptacles would be installed along the 60 ft. run. If four receptacles are installed on each circuit, 5 circuits or 15 conductors would be required (assume two current carrying conductors and one ground to each circuit). If the conductors used are 10 AWG, THHN the wires only fill the duct to 10% capacity (a walker #2 duct can contain 63 10 AWG conductors at 40% fill).

Because forty percent fill is the maximum allowed by the National Electrical Code, before ampacity and derating adjustments, it is apparent that just four runs of distribution duct would fill one No. 2 Walker duct feeder duct to forty percent. However, a raceway filled to forty percent does not leave space for changes and makes wire pulling very difficult. Industry practice is to fill the raceways to twenty percent fill. Therefore only two distribution runs in this example would fill one feeder duct. Most systems solve this problem by adding more rows of boxes.

Adding conduit feeds to the corners of boxes is another conventional way to boost feeder capacity for two duct single level systems. However, routing wires to the interior compartment of a box made for three or more ducts reduces the capacity of the two outboard duct runs, unless the depth of the box is increased. Conduit feeds can also be installed into the unused openings in the box or at the ends of duct runs. In shallow floor slabs, conduit feeds may not be possible if conduits must be routed below the duct system. Conduit feeds will also encounter a number of turns on the way to the electrical room making pulling of wires more difficult. Three U.S. Pat. Nos. 2,063,569; 2,919,827; and 3,013,690 have corner conduit provisions.

Another way to increase feeder duct capacity is to use a junction box with #4 ducts as the feeder duct and reduce the size of the distribution duct opening to fit a #2 duct. However, according to changes in the 2005 National Electrical Code regarding the derating of conductors using more than 40 current carrying conductors in a raceway such as a #4 duct would require larger and more expensive wires, which is not a preferred option.

Prior to 2005, the code did not specifically state that conductors in underfloor ducts should be derated. The installation and function of an underfloor duct system is quite different from round conduits and other raceways. In addition, testing by Underwriters' Laboratories, Inc of conductors in conduits vs. underfloor ducts and cellular raceways showed that higher currents could be carried by the wires in underfloor ducts. Nonetheless the same derating factors now apply. Consequently, the code permits only seven 12 AWG conductors in a raceway for 20 AMP circuits, and a maximum of only 40 10 AWG conductors for 20 amp circuits.

While 32 conductors fill the Walker #2 duct to 20% (the industry standard), as previously discussed in the example, only two runs of distribution ducts will fill one feeder duct run.

Two level underfloor duct systems, also called pyramid systems have larger, multiple feeder ducts on the lower level and were first designed to contain large quantities of phone cables.

In the 1960's, 25 to 100 pair phone cables ⅜" to ⅞" diameter were essential to provide telephone service to large open office spaces. Conventional single level systems had difficulties containing these large cables, but two level boxes provided the space and quantity of #4 feeder duct runs as required to contain these cables. However, increasing the floor slab depth to accommodate the system could increase cost and increase the height of floors above grade level. U.S. Pat. No. 3,264,791 attempted to address this problem. This patent also describes the problem of single level duct systems in paragraphs four and five, beginning with the third sentence in paragraph four. U.S. Pat. No. 3,428,203 and U.S. Pat. No. 3,784,042 also pertain to two level underfloor duct systems.

Cellular Metal Floor Raceways invented in the late 1940's by the HH Robertson Co. is another type of two level Infloor system used mainly above grade for steel frame buildings. The hollow spaces created by the corrugated sheet metal decking are used as distribution cells for wire and cable. The decking also serves as a platform for the concrete floor. A #4 duct, called a header duct was first used as the feeder duct raceway. It is installed on top of and perpendicular to the metal decking.

Because office areas and needs for more wiring to each workstation were increasing, multiple runs of #4 duct were required. Round hubs, about 6" in diameter called hand holes extend 1" or more above the 1½" high header duct and have removable access covers. The hand holes were positioned on the header duct over predetermined cells of the floor decking and 2" to 4" diameter holes were drilled in the floor cell for transition of wiring from the header into the floor cells. The hand hole function is similar to a two level duct underfloor duct junction box. Concrete depths of 2½" or more is poured on top of the decking and finished flush with the top of the hand holes. When used with standard three inch deep cellular decking the total floor slab will be 5½".

Holes for floor outlet fittings are drilled through the concrete and into the top of a cellular floor raceway after a tenant has determined the final location of workstations. More recently, dual and triple service outlet boxes are installed on the metal decking prior to the concrete pour on a five-foot grid similar to preset inserts on underfloor duct.

As wiring needs continued to expand in the 1960's, a "trench header" as wide as 36" began replacing multiple runs of #4 ducts as the feeder duct for a cellular floor system. Rather that a hand hole cover over a predetermined cell, a trench header has removable steel cover plates, ¼" thick and 24" long installed flush with the finished floor for its entire length.

Runs of trench duct can be 150 feet or more. Holes are field drilled into the bottom of the trench duct and the top of the metal decking for routing of cables to the workstations. Field cutting of holes was eliminated by omitting the trench header bottom plate and factory punching holes in the cellular metal floor panels as shown in U.S. Pat. No. 3,721,051. A trench header, typically 2½" high can contain large quantities of cables and wires. The wiring can be "laid in" by removing all covers prior to erecting walls and work stations.

With its advantage for communication cables, trench header also became popular for use with underfloor ducts. The trench duct is generally used as the feeder for the underfloor ducts. Underfloor distribution ducts are either installed below the trench as a two level system or into the side of a trench as a single level system. Because of larger compartments and greater quantities of electrical conductors, larger wires or smaller compartments are usually required to meet new code requirements. This did not exist prior to 2005. Some architects do not specify trench duct because cover plates can rattle and have a hollow sound when they are walked on.

Cellular metal floor panels can also be used as a single level duct system using the panels as both feeder and distribution raceways. A sheet metal frame at the intersections creates the junction box. This design is described in U.S. Pat. No. 3,453,791.

Walker offers three different sizes of three compartment cellular underfloor systems and junction boxes. The product is called WALKERCELL® and is used on grade or two pour concrete slabs. The smaller power cell in the center and an easy method to add power feeds to the junction box is not offered.

Although a number of new Infloor system products and features have been introduced, the single level junction box has seen few changes in the last ninety years. Until several years ago the most common junction box sold was about 2½" high with duct positioned one inch below the finished floor. The underfloor duct was furnished with ⅞" high, two inch round hubs for use with pedestal type outlets.

The tunnels inside this box separate the services and are divided horizontally to provide equal sized compartments for feeder and distribution ducts. Because of the boxes shallow internal height, a smooth, straight pathway through the box is not provided in either direction. Examples of this are shown in five of the referenced patents of this invention. Regardless of the height of the box the size and shape of the tunnel dividers does not change with conventional single level boxes.

Rather than 1" of concrete over the duct, today's systems use 1½" or more. Flush outlet fittings have replaced the pedestal type and this product needs 1½" or more concrete for best function. A Walker flush outlet fitting is described in U.S. Pat. No. 6,072,121. The floor covers for these outlets are the same as Walker's concrete floor boxes and can be seen in most shopping malls and retail stores.

1½" concrete depth is much less likely to crack than 1" deep. Stress cracks and fractures are a common problem with underfloor ducts, and very unsightly for projects that have bare concrete floor such as some of the big box retailers. Some applications specify six inches of concrete over the duct to prevent cracking.

Another shortcoming with existing boxes is strength and stability. A junction box and duct must be securely anchored and maintain it preset height during concrete pour. The weight of wet concrete can easily displace or sink a system that is not properly installed. This is a common problem because current boxes use long machine screws with sheet metal feet to support the box and maintain its position during the concrete pour. Some floor slabs may be 12" thick or more with 6" or more of concrete poured over the duct.

Since junction boxes are in the concrete floor before walls are erected, the access covers must be able to support construction loads. After building construction is complete, furniture, office equipment, supplies, and other materials could be moved over the access covers. Textile mills, aircraft maintenance facilities and casinos are examples of applications that need even thicker access covers. Steel covers ½" thick or more have been used.

Ideally, the top of the junction box will finish flush with the finished floor. However, concrete pours are not always perfect around the box and if the box shifts or sinks it must be fixed. For these reasons access covers may be configured to be adjustable after the concrete pour.

The leveling and support method for current junction box access covers involve four machine screws installed on ledges or into internally threaded fasteners located in the four corners of the box. For additional support, adjustable posts fastened to the bottom of the box may be used.

Loads placed on the cover plate are transferred from the screws to the ledges or base of a conventional box, and if the bottom of the box is not resting on a solid surface the loads will deflect and possibly damage the cover plate or other internal components. To allow for variations in floor slab thickness, the box may be at least slightly less in height than the floor slab.

For example, one type of shallow floor construction involves building a structural floor slab, installing the duct system on top of this slab, then covering the system with concrete. This first slab is not precisely leveled and has a rough finish. When the box is adjusted up to finished floor elevation, a slight air space could be present and allow damage or deflection to the junction box. Often the installer is not aware of how the internal post supports the access cover and does little or nothing to fill the gap below the box. If the space below the box is 1½" or more concrete can be worked under the box. However, if this step is improperly done some of the box, especially the center, may not be supported. There are other examples of floor constructions, such as slab on grade, where it is difficult to provide a solid surface under the junction box.

Placing the box down on a solid surface and adjusting the access cover before the pour is generally not an option because the duct would be further down in the floor making access to the outlet hubs more difficult. The four adjusting screws only adjust the cover up ½", then they must be replaced with longer screws. Also, if the box has more than two #2 ducts or one #4 duct it is provided with five additional internal adjustable posts and the cover plate must be removed to adjust these posts. If not adjusted, the chances for damage during construction are increased.

In addition, the frame of the box and the edge of the cover may be at different elevations resulting in concrete cracks. Finally, this entire adjustment procedure may need to be repeated if the concrete pour is not level with the top of the box.

As previously mentioned, conventional single level junction boxes are square with an equal number of openings at each side. Walker offers 12 different duct combinations: single #2 duct up to five #2 ducts; a single, double and triple #4 ducts; one #2 with one #4; one #2 with two #4's; two #2's with one #4; and a box with one #4, #2 and #4. Eight heights from 2½" to 6" in ½" increments are standard.

Walker offers these boxes in four different styles, resulting in 384 offerings. In addition custom heights have been made up to 24" deep and other special features are possible. Each change requiring a different combination of ducts requires a complicated change to the internal tunneling and other components. In one such example, there are 27 parts, not including hardware, required just to produce the box enclosure and tunneling in a Walker two duct box. As discussed, feeder ducts and junction boxes are installed in rows, typically four to six foot on center. Ducts fit between the boxes and are field cut from standard ten-foot pieces, or on larger projects can be factory cut to the exact length. For the past ninety years, underfloor duct boxes have had recessed openings for the insertion of ducts as shown in all cited patents. While this is fine for a distribution run, it can be difficult when installing feeder ducts from one box to the next. After installing ducts into the first box, the next box and the duct must be jockeyed into position. This can be difficult because a box such as one that has two #2 ducts and one #4 duct weighs 56 lbs.

Underfloor junction boxes provide the means to transition between distribution and feeder ducts. Wires are pulled from the panel to the box and from the box to the outlet hub using a fish tape or pull string. This procedure can also be done in reverse. In either case, the junction box is the pivot point for the wire and cable installation. Of course, this requires the removal of the access cover on the box. This can be a difficult task depending on the type of floor covering installed on the junction box. Junction box covers are fitted with floor finish trim frames and may have the floor finish attached to the access cover. This can make cover removal extremely difficult. A lawsuit was filed by a telephone worker who was injured while trying to remove a junction box cover in a shopping mall that had 1" marble attached.

Another problem that exists today concerns the entrance of water on the floor into the junction box. With most projects, after the floor slab is poured there is no protection from the elements. Water that can get into the junction box and duct system and do serious damage to the galvanized steel. The water may combine with the chemicals in the concrete and the lack of air circulation may damage all of the galvanized steel in a short time. To address this concern, duct tape may be installed along the side and over the top edge of the box to keep out the water on all Walker junction boxes. Although the duct taped junction box may work when properly installed, the tape must be removed during maintenance, and this can be difficult while leaving a residue or removing the paint from the access cover. A good concrete finish is also inhibited and the tape installed on the side of the box remains in the concrete and leaves a ragged edge.

A patent dealing with underfloor junction boxes, U.S. Pat. No. 4,931,597 describes a junction box using removable tunnels, extension collars and random placement of duct separators. The described arrangement reduced the number of junction box permutations and provided a horizontally and vertically divided tunnel insert with equally sized passageways through the box. Four or five smaller ducts could be provided on the feeder duct sizes, but the same quantity of openings occur on the distribution sides. This wastes material and requires closing off several openings if only two distribution duct runs are required. Many parts and pieces are required to produce this box. This system was introduced by the Square D Company in 1988. Square D discontinued this product offering in 2005.

SUMMARY

This invention pertains to any 4-sided box of any depth that is a junction or outlet box for utility services such as electric and communication wiring. The uppermost surface of the box may be installed flush with the surface of a floor structure and has a removable cover plate to gain access to the services. The floor structure may be wood, concrete, or panels supported by pedestals, commonly known as access flooring.

The present application contemplates an in-floor junction box provided from modular components configured to provide adaptability for a variety of wiring arrangements, while providing improved strength and support for in-floor applications. According to an inventive aspect of the present application, one or more reinforcing support portions may be assembled with or integral to one or more walls of the junction box for structurally supporting one or more components of the junction box, including, for example, side walls, end caps, ducts or other conduits, vertical support legs, cover plates, and internal partition plates. As used herein, "support bar" may include any suitable elongated member that may be assembled with the junction box to provide direct support for a junction box component and/or attachment between junction box components, for example, by a fastener assembled with the support bar. A support bar may be provided in any suitable cross-sectional shape or size, may be straight or bent, and may be solid or hollow. In an exemplary embodiment, square tubing is used as support bars for an in-floor junction box.

According to another inventive aspect of the present application, end walls of a junction box may be provided as separate end caps assembled with a u-shaped channel to form the junction box, which may provide adaptability as to number and orientation of duct openings, length of the u-shaped channel side walls, and height of the end caps. While the examples described herein show pass-through feeder ducts extending through openings in the end walls, and distribution ducts extending from side walls, it is to be understood that pass-through feeder ducts may additionally or alternatively extend through openings in the side walls, and distribution ducts may additionally or alternatively extend from openings in the end caps.

In one embodiment, end caps of a junction box may extend below a floor or base portion of the junction box to engage a ground or floor surface. This may, for example, provide space for passage of ducts below the base portion of the box, to provide a two-level junction box. The extended end caps may additionally or alternatively provide additional rigid support for the installed junction box, and may provide attachment points for fasteners or support legs to further anchor the installed junction box.

The present application describes an improved single level, two level, or a single/two level combination junction box that can be correctly sized and easily made to contain more feeder ducts than distribution ducts and distribute wires and cables to fit the user's present and future needs. One exemplary design includes a u-shaped channel body, two end caps, partition plates if needed, coupling straps, square tubes, underfloor duct sections, cover plate, trim frame and hardware. All of the metal parts, except the duct is manufactured to close tolerances using either laser cutting or numerically controlled punch presses. In one such embodiment, all components may be made with minimal tooling investments, and components can be shared with other styles of boxes.

Accordingly, in some embodiments, a utility floor box is provided that includes a substantially u-shaped channel having a horizontal base and side walls disposed at opposite ends of the base. Two end caps are disposed adjacent to edges of the side walls to form a box shaped enclosure having a top facing opening. Each of the two side walls and the two end caps includes at least one opening configured to allow passage of one or more conductors. In some embodiments, at least one of the two side walls and two end caps has a number of openings that is different than a number of openings in another of the two side walls and two end caps. In some embodiments the number of openings is the same in all of the two side walls and the two end caps. In some embodiments, at least one of the openings is configured to allow passage of a duct.

In some embodiments, the utility floor box includes at least one support bar passing through the first and second side walls, the support tube being supported at either of two distal ends by the side walls. The utility floor box may include at least one spacer mounted to the support tube and disposed between the support tube and an adjacent end cap. The support tube may include overhanging portions that pass out of the box shaped enclosure such that the utility floor box comprises a support mechanism mounted to the overhanging portions. The support tube may have a generally rounded cross section and is positioned in proximity to one of the end caps. In this configuration, the support tube is adapted to serve as a bushing for conductors passing through openings in the end cap. The support tube may include at least one wiring component. The support tube may include a set screw configured to contact and anchor a duct passing through the utility floor box.

Further features and advantages of the invention will become apparent from the following detailed description made with reference to the accompanying drawings.

BRIEF DESCRIPTION OF DRAWINGS

FIG. 5A is an enlarged partial view of a coupling collar portion of the utility floor box of FIG. 5;

FIG. 5B is an enlarged partial view of a corner portion of the utility floor box of FIG. 5;

FIG. 11 is an exploded perspective view of a utility floor box constructed in accordance with an embodiment of the present invention;

FIG. 11A is an enlarged partial view of a corner portion of the utility floor box of FIG. 11;

FIG. 12 is an exploded perspective view of a utility floor box constructed in accordance with an embodiment of the present invention;

FIG. 13 is a partial exploded perspective view of a utility floor box constructed in accordance with another embodiment of the present invention;

FIG. 13A is an enlarged partial view of a u-shaped channel attachment portion of the utility floor box of FIG. 13; and FIG. 13B is an enlarged partial view of an end cap attachment portion of the utility floor box of FIG. 13.

DESCRIPTION

This Detailed Description of the Invention merely describes embodiments of the invention and is not intended to limit the scope of the invention in any way. Indeed, the invention as described is broader than and unlimited by the preferred embodiments, and the terms used have their full ordinary meaning.

Figure 1:
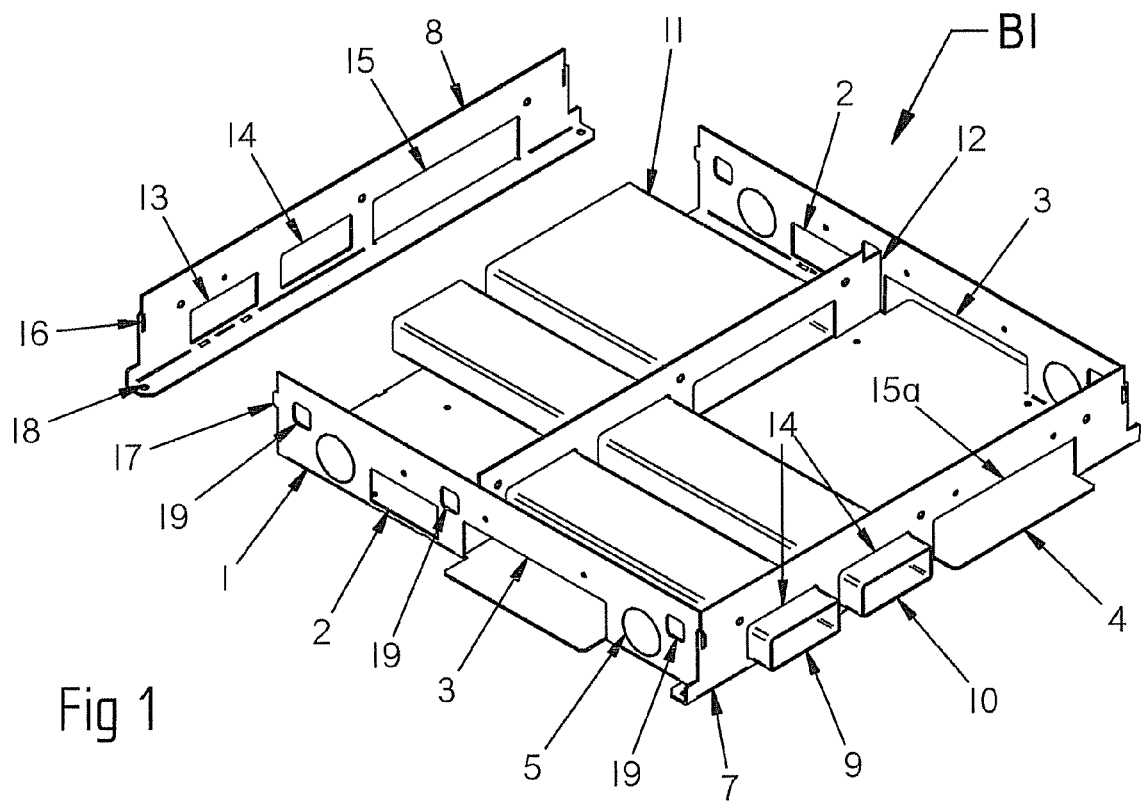
FIG. 1 is an exploded perspective view of a utility floor box constructed in accordance with an embodiment of the present invention.

FIG. 1 shows the basic enclosure components of an exemplary junction box B1, comprising a channel shaped base member 1, a first end cap 7 and an opposite opposing second end cap 8. Internal wiring duct 9 conveys wiring through the enclosure to a termination point at an opening in the vertical partition 12. Wiring duct 10 can convey wires through the box and connect to the duct from another box, or any other section of duct. The through duct 10 could also be replaced with a duct 9 terminating within the junction box B1, in either the factory or field. Ducts 9 and 10 are known as small ducts and are mostly used to convey electrical wiring. Duct 11, known as a large duct, terminates at the opposite side of another opening in the vertical partition conveying wires through the enclosure and separating them from the electrical wires. Duct 11 may be used, for example, for communication cables. It can be seen that wiring entering the box through ducts 9 or 11 can turn to extend through openings 2 or 3 respectively, or continue through openings 13 or 15A.

Openings 2 and 3 provide a termination point to connect external ducting, which will typically be used to distribute wires to the workstations. Duct openings 14 and 15 allow ducts to pass through the end caps. Internal ducting, 9, 10 and 11 will be connected to additional ducts that will typically be used to feed the wires gathered from the distribution ducts back to the electrical panels or communication terminals. However, nothing described in this invention dictates what type of wiring must be installed in any ducting.

Openings 2, 3, and 13 can be used with a coupling strap or collar to provide a secure connection to the enclosure. Ledge or support tab 4 may provide a means to lay the connecting ducts between boxes so that the boxes can be preset at their exact center-to-center spacing. Conduit openings or knockouts 5 can be used to distribute wires from the box to outlet fittings or feed wires from panels or terminals to the box.

A slot 16 allows insertion of a tab 17 to provide a square corner. Holes 18 in the flanged end of the end cap provide a means to level and anchor the box, for example, using fasteners or vertically adjustable support legs. Support openings 19 allow for installation of support bars described in FIG. 3.

Figure 2:
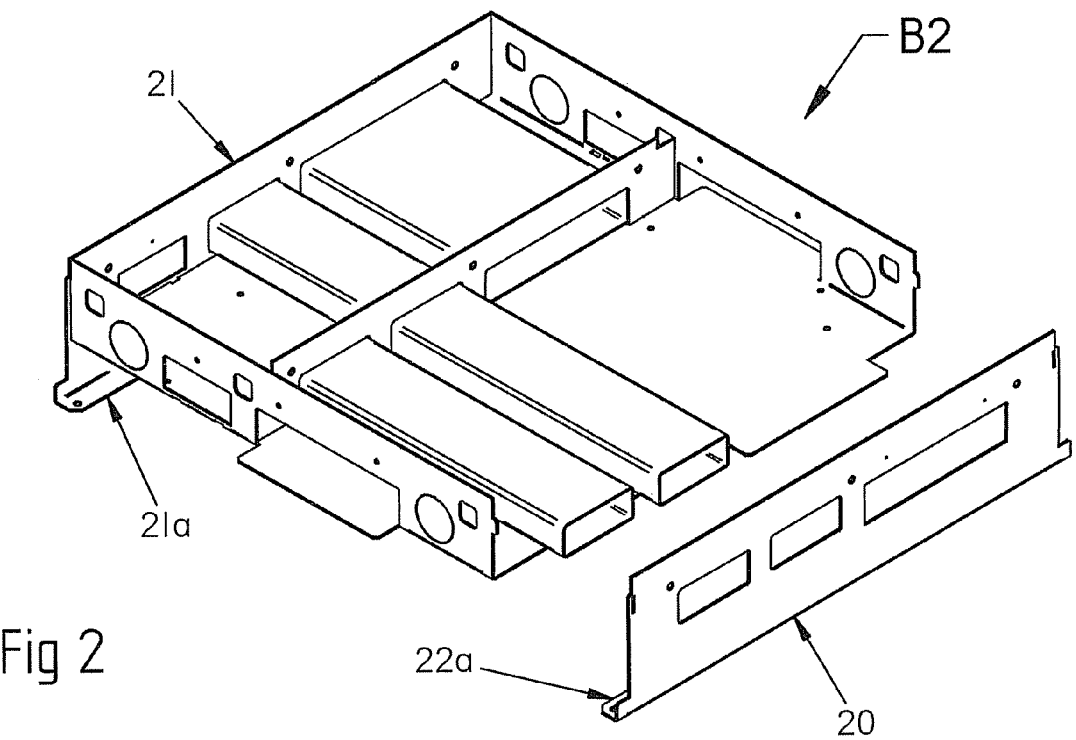
FIG. 2 is an exploded perspective view of a utility floor box constructed in accordance with an embodiment of the present invention.

In FIG. 2, the length or height of the end caps 20 and 21 is increased to provide strength to withstand the abuse during a deeper concrete pour. Floor depths of 6-12" are fairly common, and may be up to 18" or more. The material thickness of the end cap can be increased as required without changing any of the other components of the junction box B2. The end caps 20, 21 are provided with flanged ends 20a, 21a to provide additional support, and to provide an attachment point for fasteners or support legs.

Figure 3:
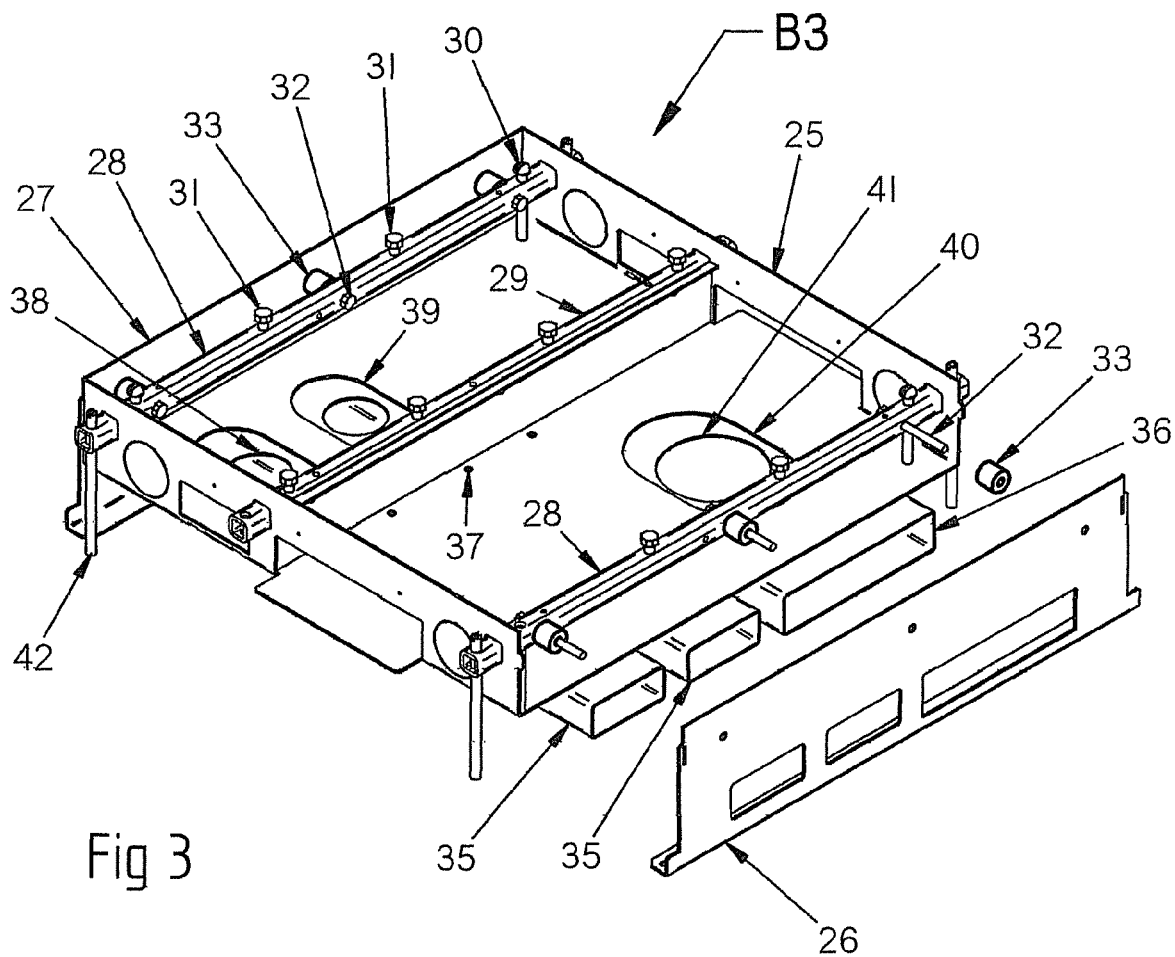
FIG. 3 is an exploded perspective view of a utility floor box constructed in accordance with an embodiment of the present invention.

In the junction box B3 of FIG. 3, the channel shaped base member 25 may be identical in configuration to the channel 1 of the box B1 of FIG. 1. End caps 26 and 27 are similar to the end caps 20 and 21 of the box B2 of FIG. 2, except for the duct opening location. These end caps 26, 27 can be shipped to the job site or selected for installation during manufacturing to change a single level box to a new two level box.

Figure 4:
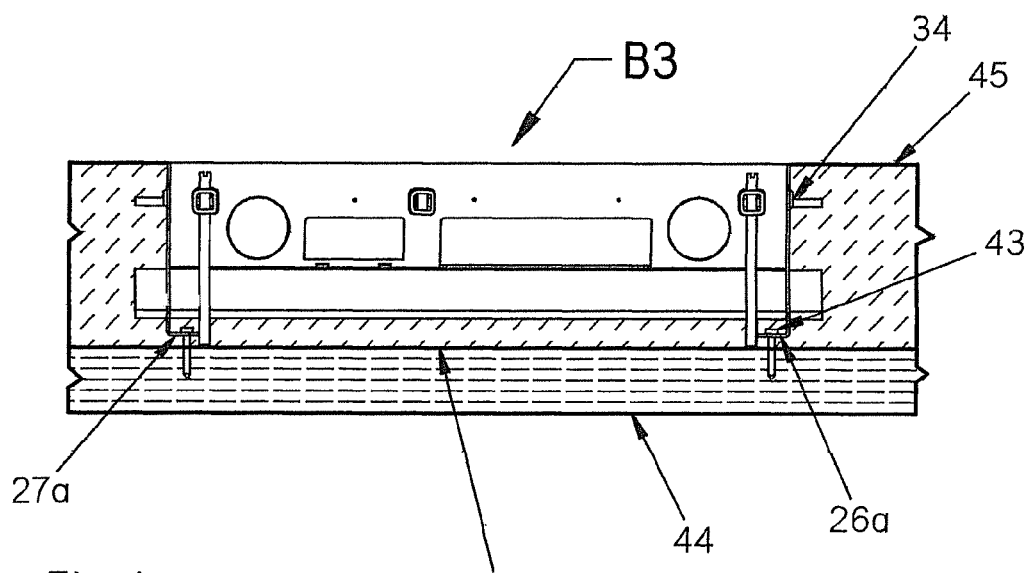
FIG. 4 is a side view of the utility floor box shown in FIG. 3 installed in a floor according to an embodiment of the present invention.
Figure 5:
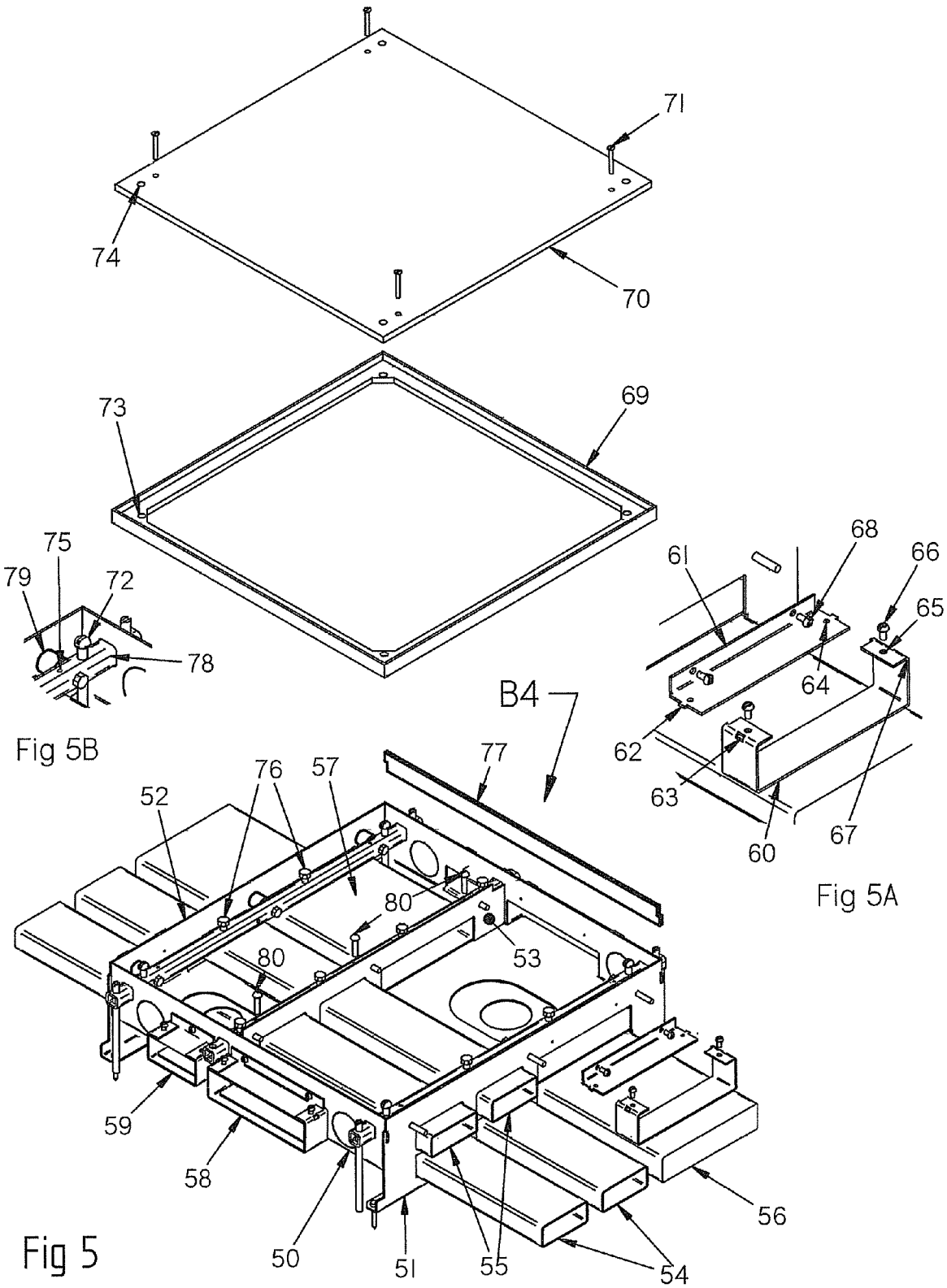
FIG. 5 is an exploded perspective view of a utility floor box constructed in accordance with an embodiment of the present invention.

As discussed above, support bars 28 and 29 installed through aligned support openings in the side walls of the u-shaped channel may provide multiple functions not seen in conventional junction boxes. For example, corner adjusting screws 30 may be assembled with the support bars to support the access cover 70 (for example, as shown in FIG. 5), with the support bars providing improved support for the cover plate and thread engagement for the adjusting screws. The adjusting screws may be variably threaded with threaded holes in the support bars to elevate the cover plate to the desired level (e.g., flush with the surrounding flooring). Conventional designs have cover plate adjusting screws installed in cantilevered ledges or other receptacles where the load is transferred to the base of the box, which may provide reduced support if the base is not resting on a solid surface 46, as shown in FIG. 4. Additional support screws 31 adjustably supporting the access cover between the corner portions may be installed in corresponding mounting holes in one or more of the support bars, for example, to prevent bowing of the cover plate. As with the adjusting screws 30, the support screws 31 do not depend on the base of the box B3 to carry loads. In other embodiments, the support bars may provide support for the cover plate without the use of fasteners (e.g., direct engagement between the support bars and the cover plate), or with other suitable support components (e.g., shims or spacers).

Hex bolts 32 or other securing fasteners are inserted into a threaded or through hole in the vertical side of the support bars 28, with spacers 33 (if needed) to stiffen the walls of the end caps 26, 27. The end caps may be retained with hex nuts 34 or other suitable hardware. The hex bolts 32 may extend into the surrounding concrete, increasing the load capacity of the support bars.

Any number of support bars may be utilized in the practice of the present invention. For example, a third support bar 29, parallel to and disposed between the outer support bars 28, may be installed through support openings in the side walls to provide additional support locations for a cover plate or partition plate. For example, support screws 31 may be assembled to the third support bar for adjustable support of the cover plate.

Additionally, a machine screw 42 or threaded rod near the end of the tube and engaged in the concrete may be used to prevent rotation of the tube when loads are applied. This screw can also be used to level the box before the concrete pour.

By omitting screws 42 and one screw 30 the other fasteners can be preassembled and the tubes may be slid into one opening of the base member at an angle and returned through the opposite opening. Other devices, such as grounding lugs, can also be installed on the tube.

Small and large ducts, 35 and 36 pass through the end cap below the base portion of the junction box B3 and are secured, for example, with setscrews through fastener holes 37. By installing the ducts below the base portion, a two-level junction box may be formed. Openings 38, 41 cut in the upper sides of the ducts 35, 36 may be aligned with corresponding openings 39, 40 in the base portion of the box B3 (which can be factory or field installed) for passage of wiring between the ducts 35, 36 and the internal upper level cavity of the box B3.

The standard length of conventional small and large ducts is ten feet, and boxes are usually spaced four, five or six feet center to center. One duct may be precut to this dimension to provide the proper spacing.

Referring to FIG. 4, fasteners, 43 may be assembled with end cap flanges 26a, 27a to anchor the box assembly B3 to a subslab 44. Concrete 45 may then be poured level with the top surface of the box B3.

Referring to FIG. 5, an easy change to the number or orientation of openings in end caps 51 and 52 may, for example, double the feed capacity of the junction box B4 without increasing its footprint. The channel shaped base member 50 is identical to the base member 25 shown in FIG. 3, and partition 53 is identical to partition 12 in FIG. 1. The lengths of ducts 54, 55, 56, and 57 can be sized to accommodate box spacings. The benefits of strength and rigidity provided by the support bars are readily apparent in this assembly.

Large and small support collars or couplings 58 and 59 may be attached to the box in this view creating a recessed opening for the ducts if desired. As shown in the enlarged view of FIG. 5A, the support collar may include an open box shaped base 60 and bent or "L" shaped top 61. Tabs 62 snap into slots 63. Threaded holes 64 in top align with clearance holes 65 in base, and when set screws 66 are tighten to the ducts the top pushes upward against the base flange. The vertical force of the set screw does not bend the flange as is more likely in a one piece strip shape of equal thickness because excessive forces on bent edge 67 do not occur. The coupling assembly may, for example, be attached to the box using screws or rivets 68.

Trim frame 69, access cover 70, and cover hold down screws 71 form an exemplary cover plate. The frame 69 rest on corner leveling screws 72 and aligns with holes 73 and 74 to permit height adjustments for the frame and access cover. Hold down screws 71 are fastened into holes 75 in the support bar. Access cover 70, hold down screws 71, frame 69, leveling screws 72, and support screws 76 provide a composite, ridged assembly. Trim frame 69 could be replaced with four identical vinyl seals 77, to provide a watertight fit between the edges of cover plate 70 and interior walls 50, 51, and 52. The vinyl seals rest on tubes 78 and spacers 79. A setscrew 80 may be installed through the support tube to secure the duct to the box B4.

Figure 6:
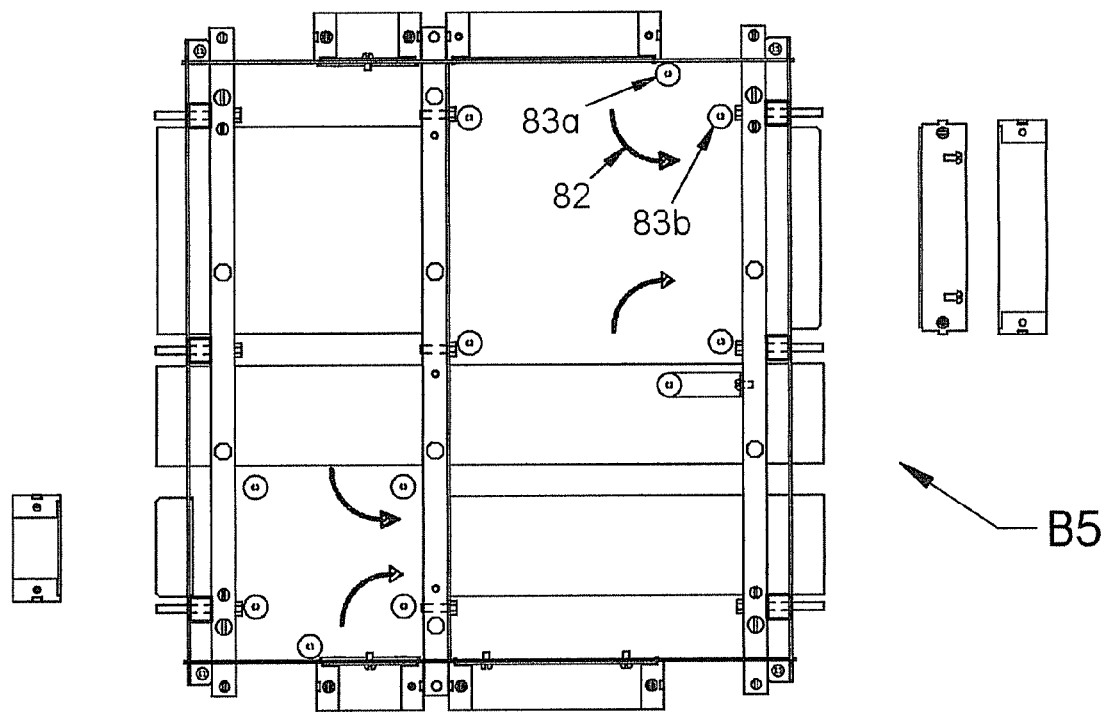
FIG. 6 is a top plan view of a utility floor box constructed in accordance with an embodiment of the present invention that includes schematic routing for wires and cables.
Figure 7:
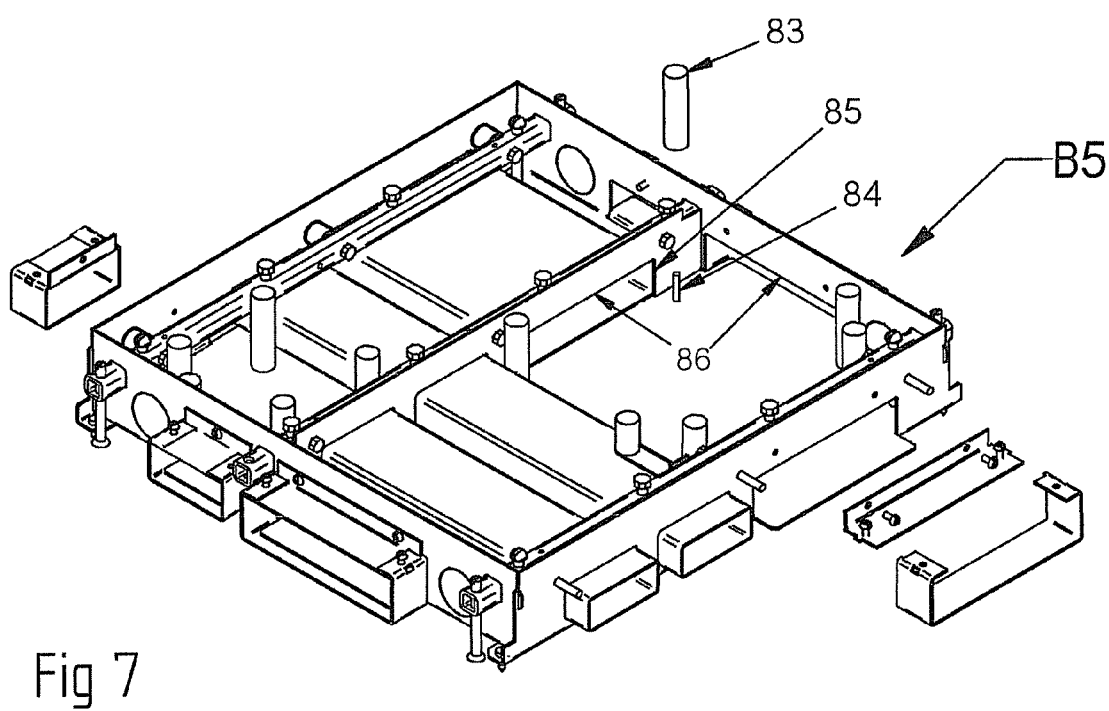
FIG. 7 is an exploded perspective view of a utility floor box constructed in accordance with an embodiment of the present invention.

FIGS. 6 and 7 shows the improvements for installing wires and cables in junction boxes B5. A single level box B5 is shown, although this improvement can be used with any box described in this invention. Arrows 82 indicate the preferred pathway for wires from the distribution ducts into the feeder ducts. Cylinders or bushings 83 may be assembled (e.g., on pins 84) with the base and positioned adjacent to vertical duct openings (e.g., in the side walls, end walls, or partition plate) to prevent wires from contacting any sharp edges. Cylinders 83A and 83B work together to provide a gentle bend radius for communication cables and may be rotatable to facilitate pulling of wires through box B5 during installation. A soft vinyl strip is installed along edges 86 to protect wires during installation.

Figure 8:
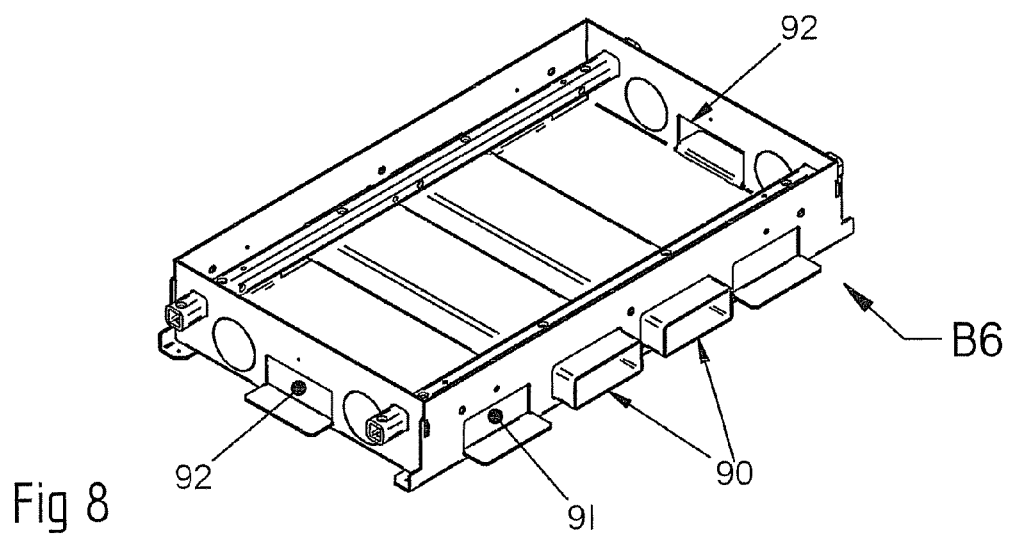
FIG. 8 is a perspective view of a utility floor box constructed in accordance with an embodiment of the present invention.
Figure 9:
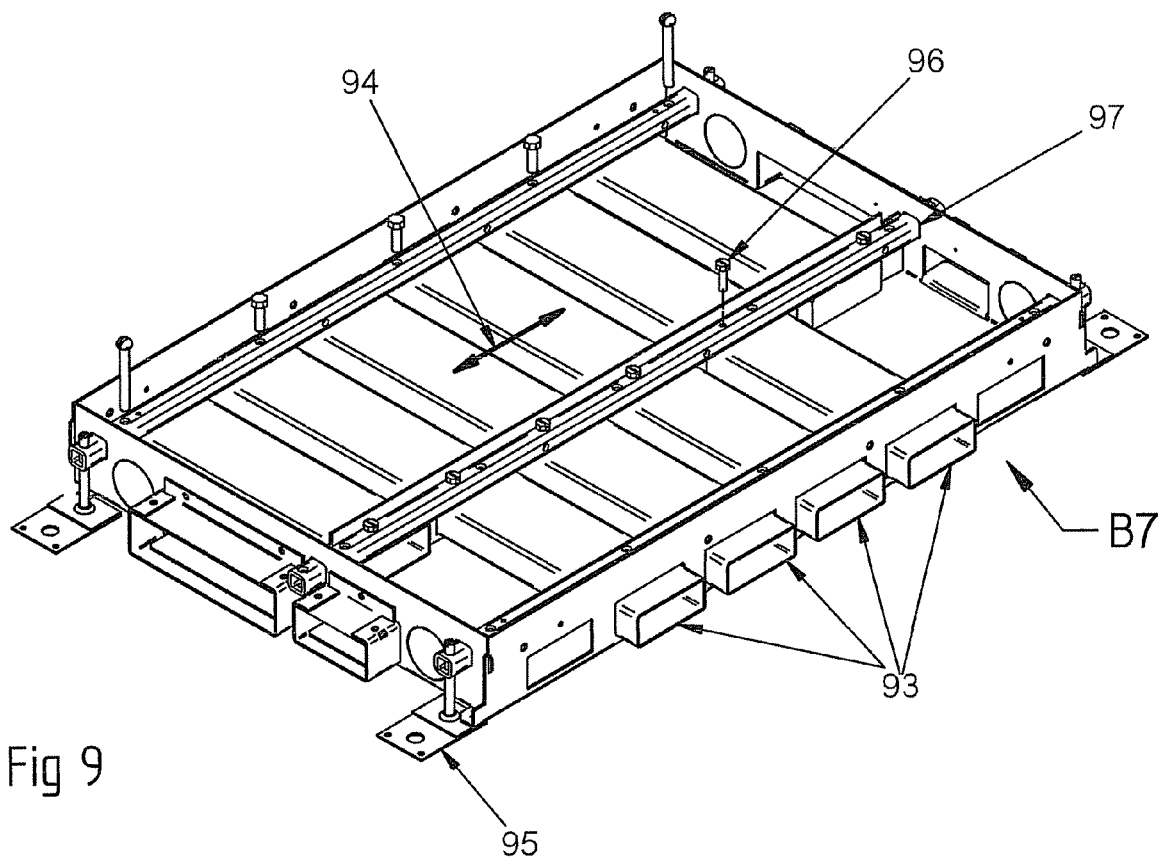
FIG. 9 is a perspective view of a utility floor box constructed in accordance with an embodiment of the present invention.

FIGS. 8 and 9 are examples of junction boxes B6, B7 that are easily made to accommodate large numbers of feeder ducts. FIG. 8 illustrates a box B6 that may be used for only one service, such as power or communications. Ducts 90 may feed wires to another box or boxes. The ducts that terminate at either side of end cap openings 91 could convey some or all of the wires through the duct opening 92, or feed wires to another box or boxes the same as ducts 91. The end caps of this box are also easily changed to add four additional ducts at the lower level similar to the box B4 in FIG. 5.

FIG. 9 shows a large capacity single service feeder box B7 with two service distribution ducts. The small ducts 93 functions the same as in box B6, but cables in the large compartment 94 only pass through the box. The footprint of one such box B7 is approximately 18"×28". Another box configured to feed the large compartment can be placed adjacent and parallel with the distribution ducts. This double row of boxes would service a large area and require less than half as many boxes if conventional boxes are used. An exemplary leveling screw assembly 95 is also shown. Each of the six ducts passing through the box B7 may be secured with one setscrew 96 that is inserted through the tube and contacts the top edge of the ducts. These ducts also provide support for support bar 97 because the top of the ducts are in close proximity to the bottom of the support bar. The advantages provided by the support bar may increase as more feeder ducts are added.

Figure 10:
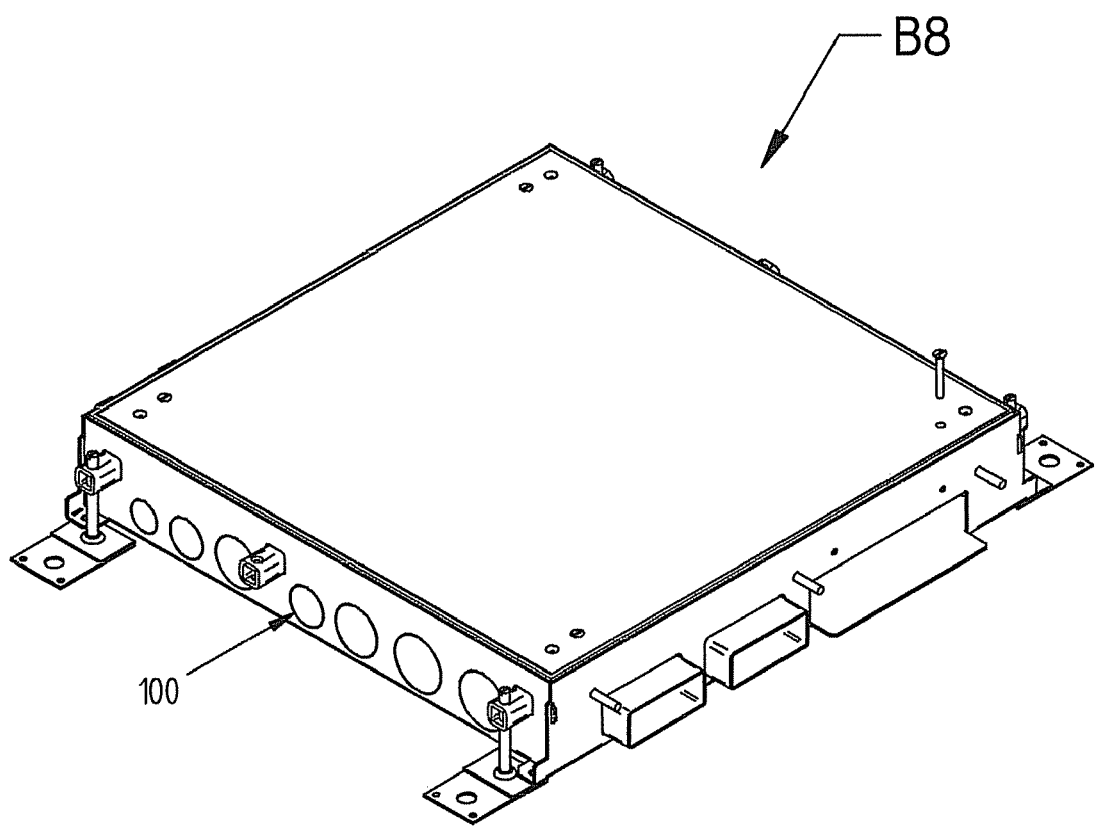
FIG. 10 is a perspective view of a utility floor box constructed in accordance with an embodiment of the present invention.

FIG. 10 shows a fully assembled single box B8 where distribution duct openings are replaced with various sized conduit openings or knockouts 100. All other components of the single level box may remain the same.

The boxes B9, B10 in FIGS. 11 and 12 are outlet boxes that may be used to hold duplex receptacles or other wiring devices. Brackets 110 hold the wiring devices. The box B9 of FIG. 11 may be used in a raised access floor having removable floor panels, and the box B10 of FIG. 12 may be used in a concrete floor. The shape of the base channels and end caps for both boxes may be the same as a single level junction box. Both boxes B9, B10 may be provided with various sized and shaped conduit holes or knockouts, 122.

Referring to FIG. 12, the support bars 111 may provide similar functions as those of the single level junction box. Additional third and fourth support bars 112 may extend perpendicular to the first and second support bars 111 and through support openings in the end caps. These support bars 12 may extend into the concrete similar to support bars 111, and may support the device brackets and access cover. A closure plate 113 and divider 114 may be used to divide the box into two services.

The box B9 in FIG. 11 uses the support bar 114 (FIG. 11A) to support the cut out in the raised floor access panels. A flange 115 is attached to the support bar 114 with screw 116 that may extend down to the top of the sub slab height. A hollow cylinder 117 fits over the screw and is welded to a foot 118 to form a vertical support leg. Tube 119 ends flush with the inside of flange 115a, which is attached to the end cap.

The access cover 120 and egress cover 121 permit the exit of wires from the box. Egress cover 121 can be rotated 90 degrees to open or close the opening. Many other styles and types of access cover assemblies can be provided with this box B9.

In other inventive embodiments of the present application, other support arrangements may be utilized with a u-shaped channel and end cap assembly arrangement, either instead of, or in addition to, the support bar arrangements described herein. In one such embodiment, one or both end caps may be provided with a reinforced support portion configured to interlock with corresponding cut-outs (or other receiving features) in the side walls of the u-shaped channel. For example, a support portion may be integral with or assembled directly to one or both end caps, with the support portion being received in aligned cutouts in the opposed side walls of the u-shaped channel. A support portion may include a bar or elongated member welded or fastened to the end wall of the end cap. Alternatively, the end cap may be bent or extruded to form an integral support portion.

FIG. 13 illustrates a portion of an exemplary junction box B11 that includes a u-shaped channel 123 having side walls 124 with support receiving openings or cutouts 125. An end cap 126 is provided with a c-shaped support portion 127 sized to be received in the cut-outs 125. An opposed end cap (not shown) may, but need not, be identical to the illustrated end cap 126. This support portion 127 functions similarly to the support bars described above, in providing a reinforced attachment location for the modular components of the junction box B11. As an additional advantage, this c-shaped bend in the end cap 126 forms an external channel that may receive concrete after installation of the box B11 when concrete is poured around the box B11, thereby providing further reinforced support of the cover plate against loads applied to the floor. As shown, additional support openings 129 may be included in the side walls 124 to receive one or more support bars (as described above), for additional support of the cover plate or internal components of the junction box B11.

The support portion 127 may include mounting holes 128 for securing a cover plate (which may be similar to the cover plate 70 of FIG. 5) to the junction box B11. While the interengagement of the end caps 126, cover plate, and side walls 124 may be sufficient to secure the end caps 126 to the u-shaped channel 123, additional fastening arrangements may be provided to secure the end caps 126 to the side walls 124. For example, as shown in FIGS. 13A and 13B, the side walls 124 may be provided with tabs 130, and the end caps 126 may be provided with slots 131 positioned to receive the tabs 130, which may be bent after insertion to secure the end caps 126 to the side walls 124. Also, vertically adjustable support legs 132 may be assembled through threaded openings 133 in end flanges 134 of the end caps 126 to rigidly support the junction box B11 on an uneven sub-base of a floor structure.

Many advantageous features are provided by the invention, as described in the above exemplary embodiments and as further outlined below.

An exemplary utility floor box includes a three piece construction having a u-shaped channel base and two end caps or plates. Preassembly of support bar components and the method of assembly to the u-shaped channel is facilitated. Spacers between the tube and end caps may be used to stiffen the end caps. Screws are installed in the ends of the support tubes to support and anchor the box to the form or sub slab. The support bar may be used as a wire-protecting bushing where ducts terminate inside the box. Ground lugs or other wiring components may be installed to the support tubes. One set screw may be installed through the support tube to secure the duct tunnels or ducts that pass through the box. A box with more feeder ducts than distribution that is easy to manufacture may be provided by selecting the desired duct opening arrangements in the end caps and u-shaped channel. A new support collar or coupling assembly that can be fastened to the side wall of the box in the factory or field may also be provided. A two level box that can use standard 10 foot long ducts coupled end to end on the lower level for feeds may also be provided. A box with conduits instead of ducts for the distribution sides of the box may be provided. The same three piece design can be used to create a concrete floor outlet box. The same design can be used to produce a unique raised access floor box. A new access cover with egress openings that protect cables may also be provided. Tubes or bushings that rotate proximate to the interior duct openings may be used to permit pulling cables through the box without removing the access cover. A rubber or vinyl filler between the internal sides and exterior cover plate edges of the cover plate to make the box water tight and eliminate the need for an aluminum trim frame if carpet squares will be installed over the box may also be provided.

The feeder duct sides of the box can have as many ducts as required. These ducts can terminate at openings in the box side wall, terminate in the box or continue through to the next box without wiring capacity restrictions. The preferred feeder duct for electrical wiring may be a smaller duct. Feeder ducts for communication or other services can use smaller or larger ducts. Separate tunnel dividers may be eliminated.

The distribution side of the box may have only two ducts, one for electric and one for communications, providing an opportunity for a rectangular footprint to save material. These distribution ducts terminate at openings in the junction box side wall.

This new invention does not need recessed openings for insertion of feeder ducts, as the support collar may provide for flush alignment between an end of a duct and a wall of the junction box. This permits all boxes in a row to be positioned at their exact center-to-center spacing before any feeder ducts are installed.

A new coupling strap or support collar assembly is used for ducts that attach to the box side wall. The coupling assembly is slid over the end of the duct, the duct and coupling is positioned adjacent to the junction side wall, the coupling is attached to the box, and setscrews are tightened to secure the duct to the coupling. The design of this coupling eliminates any bending of the coupling when setscrews are tightened. Alternatively, the support collar or coupling can be attached to the box side wall independently to provide a recessed opening, which may be desired for distribution duct runs.

Support bars, such as square or rectangular steel tubes, may be inserted through the box side walls into the surrounding concrete for support and assembly of junction box components. This new design securely fixes the support bar preventing rotation and increasing load capacity. Cover support bolts, adjustment screws, cover plate retention screws, and duct set screws can be easily located along the length of these support bars. This support bar provides a means of attachment and support for the end cap and internal partition plate. The attachment means, bolts or screws, for the end caps extend outwardly and into the surrounding concrete to reduce the unsupported span of the tube and prevent rotation. Bolts or screws may be used to hold the internal partition to the support tube to provide additional support.

Spacers installed on the attachment means between the tubing and end caps may also help stiffen the end cap side wall and at the same time position the end cap in its exact location securely attached to the box channel. Alternately, replacing the spacers with a short length of the square tubing securely attached to the tubing and extending through the side wall could provide additional support for the tube.

Additional cover plate load capacity is provided for the four adjusting screws which may be installed at the four corners of the box. The length of this screw may extend more than 1" below the tube to allow for maximum after pour adjustment while being retained by two sets of threads in the tubing to reduce vertical deflections during loading.

Setscrews can be installed at any location along the support tubing to secure the feeder ducts. Only one setscrew may be required to secure the duct. For ducts that terminate inside the box the support bar may also provides a smooth pulling surface when installing wires and cables. Other items such as grounding lugs, cable ties or other wiring accessories can be easily fastened to the tubes.

Depending on the length of the tube and the location of the corner adjusting screws, it is possible to have all fasteners pre-assembled to the tube because the tube can be slid at a slight angle through one opening in the side wall, returned to a perpendicular position, and inserted into the opposite side wall opening. The support bars may be provided in desired lengths for insertion through the support holes, for example, by cutting or laser machining square tubing. Preassembly of these support bars reduces the number of components that are required at final assembly.

Because of the additional strength provided by this new support method, thickness of the access cover can be reduced. For example, a cover plate that is 18" square and ⅜" thick would weigh 34½ lbs. Using a ¼" thick plate would reduce the weight to 23 lbs. A 3/16" thick plate would weigh 17¼ lbs. This weight reduction saves material cost and reduces factory and field labor and effort to remove and re-install the cover plate. The total weight of the three tubes to support this cover weighs 5 lbs.

Conventional junction boxes use machine screws and sheet metal feet to support the junction box. While this is acceptable if the box is not elevated more than several inches, in deeper slabs these support screws can permit lateral movement and displacement of the box during the concrete pour. The height of the end caps of the improved box can be increased to elevate the box ten inches or more. The height of the end plate may be slightly less than the floor depth to allow for minor adjustments using screws, shims, or vertically adjustable support legs to rigidly engage the ground surface and bring the top of the box to finish floor elevation. All or part of the end caps can also be made using thicker material to increase its strength without having to change other box components.

Round, rotating vertical tubes or bushings may also be used to protect wires and save installation time. Tubes are located to provide the maximum bend radius for the wires and cables. Pins fastened to the bottom of the box hold the tubes but allow them to rotate. A pull string is commonly installed in most infloor systems and terminates in each junction box. With one embodiment of this invention, however, a pull string would be installed from the end of each distribution duct to the box and then into the feeder duct and back to the communication or electrical room. When a new workstation is activated, new wires, and a new pull string, can be attached to the pull string in the electrical room and pulled to the workstation. Therefore, removal and disruption to the floor finish on the cover plate and interference with another workspace may be eliminated. Also, a plastic bushing may be installed along the top edge of duct openings inside the box that are exposed to wires or cables. The soft vinyl extrusion reduces strain and stripping of wires during wire installation.

Conventional underfloor duct junction boxes were not designed for other applications. The inventive aspects of the present application can be adapted to make many styles of boxes using similar components as will be discussed. According to an inventive aspect of the present application, the end caps may be easily changed to create a single or two level box, or to convert between single and two level boxes. Two level systems require deeper floor slabs, but provide increased wiring capacity and increased flexibility.

The inventive new concepts of the present application allow the ducts to be supported, located, and pass through openings in the end caps. Pre-punched openings in the top surface of the duct can be provided to match openings in the bottom of the junction box for wiring transition to distribution raceways.

One setscrew in the base portion of the box may be used to secure each of the lower level ducts. Rather than terminating the ducts into junction boxes as is common, ducts can be passed through and joined creating one continuous run. For example, if the boxes are installed on five foot centers a ten foot length of duct can slide through the openings in two boxes, extending out 2½ feet from each box. This procedure may then be repeated for the next set of boxes. This eliminates field cutting and deburring of duct ends as may be required when duct must be cut to fit between boxes.

All of the benefits of a single level box and a two level box can be combined with this invention by simply changing the end caps to accommodate both levels of ducts. This may be a significant improvement because the number of feeder ducts may be doubled compared to the same sized single level box.

A single service box with one or more feeder ducts and one or more distribution runs can be easily manufactured. A two-service box with six power feeds and no communication feeds, but with distribution for both power and communication can also be easily manufactured.

This conversion and adaptability exemplifies how easily boxes with any combination of ducts can be designed and manufactured in practice of the invention. As another example, this new box can be easily changed to use conduits instead of underfloor ducts as the distribution raceways. The conduits can be used to distribute wires and cables to conventional concrete floor boxes or other outlets at fixed locations. This system is excellent for small offices or retail outlets. Because this new box easily accommodates more feeder ducts than distribution ducts, a junction box of the present application may be easily adapted to meet the new requirements of the 2005 National Electrical Code.

This new box concept can be easily adapted to provide a unique and new conventional concrete floor box that is used with the junction box as described above. Deflection of floor box covers is a common problem in malls and retail outlets. The support bar concept provided by this invention provides the same benefits as previously described. Another feature of the access cover for this box is a single pop up egress hood used for both electric and communication cables. The hood prevents moving carts or equipment from rolling directly over the opening and protects cables from damage. Another is the method of routing cables through the box.

A raised floor box is another application that will benefit from this new concept. Conventional raised floor boxes are installed by dropping the box from the top of the raised floor into openings cut into the raised floor panel. A trim flange larger than the opening in the floor prevents the box from dropping through the opening. This opening weakens the raised floor panel and no support methods are provided using conventional outlet boxes.

The new box and trim flange of the present invention allows the raised floor panel encompassing the box to be removed without disturbing the floor box. This may be done using an adjusting screw assembly that is attached to the support tube and supports both the box and access floor panel. A ledge or flange around the perimeter of the box provides additional support for the panel.

The access cover plate may be supported and attached as previously described in the junction box. The access cover for both the concrete floor box and raised floor box are the same.

Any of the previously described underfloor duct junction boxes could be made with the same supporting framework as the outlet box just described and used in a raised access floor. These boxes will improve wire management of raised floor systems by eliminating the tangled wiring below raised access floors and provide secure, contained, and easily accessible wiring pathways.

One embodiment of the invention may be described as follows. In an in-floor duct wiring system, a single level junction box enclosure may be adaptable to receive a greater plurality of ducts at of one of two opposing sides, including a one piece sheet metal channel and two opposed sheet metal end caps, the end caps receiving the greater plurality of ducts. The end caps contain a plurality of small openings for electrical wiring ducts where one or more the ducts can terminate within the enclosure, pass through the vertical leg of the end caps, terminate just beyond the exterior leg of the end cap, or continue to or through another junction box. The ducts provide contoured surfaces for a smooth unobstructed wiring pathway inside the junction box. The end caps contain any combination of small and large openings for communication wiring ducts, or the like, including the same function as the electrical wiring ducts. The communication ducts are combined in the same end cap and junction box enclosure with electrical ducts or a separate end cap and separate enclosure. A bottom flange of the end cap may align with the base of the channel, or extend beyond the channel and terminate in close proximity to the sub-base of the floor structure. The flange end may attach to mechanical devices for support, leveling or anchoring of the junction box assembly. The one-piece sheet metal channel contains one or more openings in the vertical leg to receive small or large ducts, the top surface of the ducts on the same horizontal plane as the ducts contained in the end caps. The ducts may terminate at and be secured to the side wall of the channel. The side wall may contain a combination of conduit opening or knockouts and duct openings; or contain all conduit openings or knockouts.

One embodiment of the invention may be described as follows. For an infloor duct wiring system, a two level junction box enclosure is adaptable to receive a greater plurality of ducts at one of two opposing sides, and may include a one piece sheet metal channel and two opposed sheet metal end caps, the end caps receiving the greater plurality of ducts. The end caps contain a plurality of small openings for electrical wiring ducts where one or more the ducts pass through openings in the side walls of the end caps. The top surface of the ducts correspond to the bottom surface of the sheet metal channel. The ducts may terminate just beyond the end caps, or may continuing to another junction box. The end caps may contain a combination of small and large openings for communication wiring ducts, or the like, and may perform the same function as the electrical wiring ducts. The communication ducts may be combined in the same end cap and junction box enclosure with electrical ducts or a separate end cap and separate enclosure. The bottom flange of the end cap may be positioned proximate the base of the wiring ducts, or may extend beyond the base of the wiring ducts and terminate in close proximity to the sub-base of the floor structure. The end flange may attach to mechanical devices for support, leveling or anchoring of the junction box assembly. The one piece sheet metal channel contains one or more openings in the vertical side walls to receive small or large ducts the ducts terminating at and secured to the vertical side wall; the leg may contain a combination of conduit opening or knockouts and duct openings; or contain all conduit openings or knockouts the one-piece sheet metal channel base may contain one or more openings in its base corresponding with the top surface of the wiring ducts; the ducts may contain one or more openings in its top surface corresponding with openings in the base.

One embodiment of the invention may be described as follows. For an infloor duct wiring system, a double level junction box enclosure is adaptable to receive a greater plurality of ducts at of one of two opposing sides, and may include a one piece sheet metal channel and two opposed sheet metal end caps, the end caps receiving the greater plurality of ducts, wherein the end caps containing any arrangement of small and large openings for wiring ducts, or the like.

One embodiment of the invention may include: two or more support bars inserted into opposing openings in the sheet metal channel, extending beyond the walls of the channel, engaging the surrounding floor structure; the tubes provided with threaded or clearance holes in vertical surfaces to provide a mechanical means of securely attaching the end caps to the channel. The attachment means extends into the surrounding floor structure; the attachment having a spacer between the interior vertical wall of the end cap and vertical face of the tube. The spacer may be cylindrical or rectangular in shape and may be attached to the attaching means or welded to the mating vertical face of the support bar. The support bar includes threaded openings through horizontal wall(s) for mechanical fasteners located inside the enclosure to provide leveling, support and hold down for the access cover; set screws to secure ducts; threaded or through holes on either horizontal or vertical surfaces for attachment of grounding lugs, cable ties, bushings, or other wiring devices; and threaded or through holes on the horizontal surface outside the enclosure containing mechanical devices for support, leveling or anchoring of the junction box assembly. The support bars are provided with threaded or clearance holes in vertical surfaces, providing a mechanical means to fasten one or more vertical partitions; the vertical partition parallel and adjacent to the tubes to separate wiring services and containing openings to terminate or pass through ducts for single level junction boxes; or omitting openings for two level boxes. The means of assembly of the tubes to the junction box channel may be configured such that the end of the first opening is positioned at a horizontal or vertical angle to clear the vertical side or horizontal edge of the channel. The support bar may be returned to a horizontal and parallel plane, and inserted into the opposing opening and positioned equally between the side walls of the junction box channel.

One embodiment of the invention may include a duct coupling adaptor, the coupling adaptor including a sheet metal channel with inwardly formed legs and a sheet metal angle. The channel may be provided with horizontal slots in the side walls for receiving tabs, and clearance holes in the legs for receiving set screws. The angle may be provided with tabs and threaded set screw holes on a horizontal surface for securing the duct to the adaptor and clearance holes on a vertical leg to provide a means of attachment to the vertical leg of the junction box channel. The coupling adaptor assembly is attached independent of the ducts, thereby creating a recessed duct opening; or positioned around and just behind the duct end; the duct end positioned adjacent to the vertical leg of the junction box channel. In assembly, the adaptor may be moved forward to the vertical of the junction box channel. The adaptor may be attached to the leg, and the duct secured with the set screws.

One embodiment of the invention may include vertical cylinders approximately the same height as the internal space inside the interior; the cylinders placed along any wiring pathway or near any internal duct opening. The cylinders may be held in place and free to rotate by round pins projecting from the base of the junction box channel. A soft vinyl strip may be installed along and slightly below any horizontal duct opening exposed to wires; an access cover flush with the top edge of the sheet metal channel and sheet metal end caps, with means for attachment. A frame or individual pieces of material may be placed between the vertical interior of the enclosure and exterior edges of the access cover providing a watertight seal.

One embodiment of the invention may include a u-shaped channel, support tubes, two end caps, access cover, trim, hardware, and partitions to separate electrical wiring from other services for use as a concrete floor outlet box. The access cover may be provided with egress hood.

One embodiment of the invention may include a supporting ledge for the access floor around the perimeter of the box. A trim flange independent of the box but the same internal size as the exterior of the box covers the uneven cutout in the panel and allows the removal of the access floor panel without disturbing the box.

One embodiment of the invention is a feeder box for raised floor outlet boxes. The feeder box includes a perimeter ledge to support the raised floor panel.

The various styles of infloor junction boxes described in this invention relate to products that contain wires and cables for use with underfloor ducts and conduits. Floor outlet boxes, and raised floor outlet boxes is also described in this invention. Water, gas, or air lines could also be installed within this box, but these utilities are not described in this invention. Buildings such as offices, schools, shopping malls, grocery, office supply, electronic stores, fitness centers, and casinos are excellent applications for these new products.

While various aspects of the invention are described and illustrated herein as embodied in combination in the exemplary embodiments, these various aspects may be realized in many alternative embodiments not shown, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however; such values and ranges are not to be construed in a limiting sense and are intended to be critical values or ranges only if so expressly stated.

What is claimed is:

1. A utility floor box comprising:
 a substantially u-shaped channel defining a horizontal base and opposed first and second longitudinally extending side walls, with at least one of the first and second side walls defining a branch opening;
 first and second end caps assembled with the side walls to define first and second end walls, the first and second end walls defining aligned first and second duct openings;
 first and second horizontal support bars extending through aligned first and second support openings in the first and second side walls, the first support bar being secured to the first end cap to affix the first end cap to the u-shaped channel, the second support bar being secured to the second end cap to affix the second end cap to the u-shaped channel opposite the first end cap;
 first and second vertical support legs secured to the first support bar, and third and fourth vertical support legs secured to the second support bar, the first, second, third and fourth support legs being vertically adjustable with respect to the corresponding first and second support bars;
 a third horizontal support bar extending between and substantially parallel to the first and second support bars, the third support bar extending through aligned third support openings in the first and second side walls; and
 a cover plate received between the first and second side walls and between the first and second end walls, the cover plate being supported by the first, second, and third horizontal support bars.

2. A utility floor box comprising:
 a body having a horizontal base; first and second longitudinally extending side walls extending from first and second opposed edges of the horizontal base, at least one of the first and second side walls defining a branch opening; and first and second laterally extending end walls extending from third and fourth opposed edges of the horizontal base, at least one of the first and second end walls defining a duct opening;
 first and second horizontal support bars extending through aligned first and second support openings in the first and second side walls; and
 first and second vertical support legs secured to the first support bar, and third and fourth vertical support legs secured to the second support bar, the first, second, third and fourth support legs being vertically adjustable with respect to the corresponding first and second support bars.

3. The utility floor box of claim 2, wherein the first and second support bars comprise square tubing.

4. The utility floor box of claim 2, wherein the body comprises a substantially u-shaped channel defining the horizontal base and side walls, and first and second end caps assembled with the side walls to define the first and second end walls.

5. The utility floor box of claim 4, wherein the first and second end caps are secured to the first and second support bars by fasteners.

6. The utility floor box of claim 5, further comprising spacers disposed on the fasteners and positioned between the first and second end caps and the corresponding first and second support bars.

7. The utility floor box of claim 4, wherein the first and second end caps extend below the horizontal base to define corresponding first and second ground surface engaging end portions.

8. The utility floor box of claim 2, wherein at least one of the first and second support bars includes a vertically extending fastener hole for receiving a fastener to secure a duct extending through the duct opening.

9. The utility floor box of claim 2, further comprising a third horizontal support bar extending between and substantially parallel to the first and second support bars, the third support bar extending through aligned third support openings in the first and second side walls.

10. The utility floor box of claim 2, wherein the duct opening is disposed below the horizontal base, and the branch opening is disposed above the horizontal base.

11. The utility floor box of claim 2, further comprising third and fourth horizontal support bars extending through aligned third and fourth support openings in the first and second end walls.

12. The utility floor box of claim 2, further comprising a vertically extending cylindrical bushing secured to the horizontal base proximate the branch opening, the bushing being rotatable to facilitate installation of wiring through the branch opening.

13. The utility floor box of claim 2, further comprising a duct collar assembled to an outer surface of the body to surround one of the branch opening and the duct opening, the duct collar configured to support a duct that aligns with but does not extend through the one of the branch opening and the duct opening.

14. The utility floor box of claim 2, further comprising an outward extending flange disposed on an upper perimeter of the body for supporting raised floor members surrounding the utility floor box.

15. An in-floor wiring support system comprising:
- a substantially u-shaped channel defining a horizontal base and opposed first and second longitudinally extending side walls disposed entirely above the horizontal base, with at least one of the first and second side walls defining a branch opening and the horizontal base defining a duct access opening;
- first and second horizontal support bars extending through aligned first and second support openings in the first and second side walls;
- first and second vertical support legs secured to the first support bar, and third and fourth vertical support legs secured to the second support bar, the first, second, third and fourth support legs being vertically adjustable with respect to the corresponding first and second support bars;
- first and second laterally extending end walls assembled with first and second ends of the u-shaped channel such that an upper portion of each of the first and second end walls extends above the horizontal base, and a lower portion of each of the first and second end walls extends below the horizontal base, the lower portions of the first and second end walls defining aligned first and second duct openings laterally aligned with the duct access opening; and
- a duct extending through the first and second duct openings for containment of electrical wiring extending through the utility floor box, the duct including a hole aligned with the duct access opening and in communication with the branch opening for passage of electrical wiring from the duct to the branch opening.

16. The system of claim 15, wherein the first and second end walls being fastened to the corresponding first and second horizontal support bars.

* * * * *